United States Patent [19]
Sato et al.

[11] Patent Number: 5,093,762
[45] Date of Patent: Mar. 3, 1992

[54] ELECTRIC DOUBLE-LAYER CAPACITOR

[75] Inventors: Kazuhiko Sato; Kazuhiko Kuwata; Hiroyasu Yamamoto, all of Hyogo; Keitaro Katsu, Tokyo, all of Japan

[73] Assignee: NEC Corporation, Tokyo, Japan

[21] Appl. No.: 670,339

[22] Filed: Mar. 15, 1991

[30] Foreign Application Priority Data

Mar. 16, 1990 [JP] Japan ................... 2-66594
Jan. 30, 1991 [JP] Japan ................... 3-9465

[51] Int. Cl.$^5$ .................... H01G 9/00; H01G 3/06
[52] U.S. Cl. .................... 361/502; 361/540; 29/25.03
[58] Field of Search .................... 29/25.03, 25.42; 367/306, 502, 534–540, 328, 329, 330; 174/52

[56] References Cited

U.S. PATENT DOCUMENTS

| | | | |
|---|---|---|---|
| 2,260,842 | 10/1941 | Schwartzhaupt | 361/329 |
| 3,070,647 | 12/1962 | Solow et al. | 174/52 |
| 3,586,934 | 6/1971 | Nakata | 361/329 |
| 3,854,980 | 12/1974 | Burnham | 117/61 |
| 4,394,713 | 7/1983 | Yoshida | 361/502 |
| 4,558,399 | 12/1985 | Toyama et al. | 361/540 |
| 4,882,115 | 11/1989 | Schmickl | 361/538 |
| 5,013,505 | 5/1991 | Masuda | 264/130 |

FOREIGN PATENT DOCUMENTS

62-174338  11/1987  Japan.

*Primary Examiner*—Donald A. Griffin
*Attorney, Agent, or Firm*—Burns, Doane, Swecker & Mathis

[57] ABSTRACT

The components of the electrical capacitor according to the present invention consist only of unit cells, terminal plates and a molded portion, and operations such as caulking, etc. are not required so that production of the capacitor can be easily performed, by arranging and pressing electrode plates having terminals at the top and the bottom of the stacked unit cells of an electric double-layer capacitor in the stacked direction thereof, and applying molding process with resin, as it is.

5 Claims, 7 Drawing Sheets

ELECTRIC DOUBLE-LAYER CAPACITOR

BACKGROUND OF THE INVENTION

1. Field of the Invention

The present invention relates to an electric double-layer capacitor and a method for producing the same.

2. Description of the Prior Art

As one of means for obtaining a capacitor having a large capacity, there is a method utilizing the production of an electric double-layer which is obtained by contacting activated carbon particles with an electrolytic solution as disclosed in the specification of U.S. Pat. No. 3,536,963.

Figure 1:
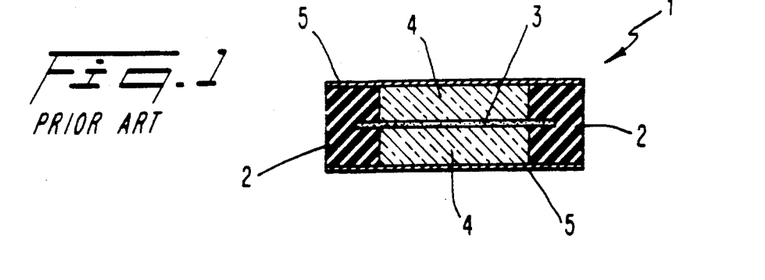
FIG. 1 is a longitudinal section showing a unit cell of a prior art electric double-layer capacitor.
Figure 2:
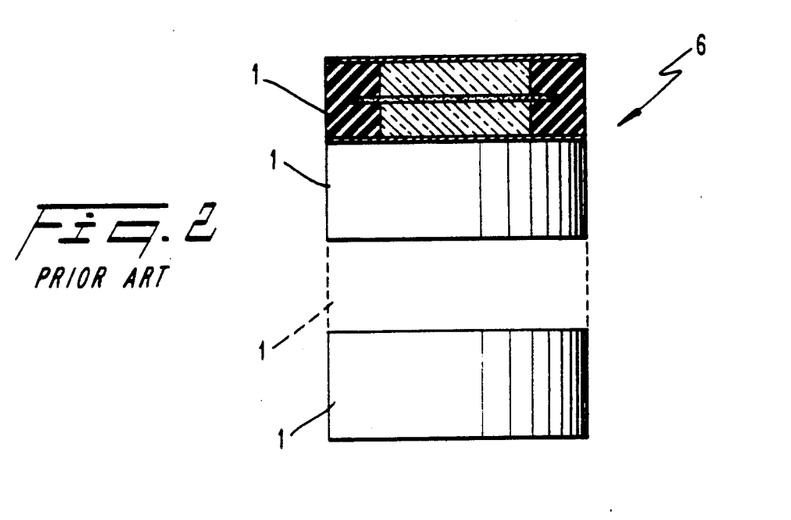
FIG. 2 is a longitudinal section of stacked unit cells of FIG. 1.

FIG. 1 is a cross-section view showing a construction of a basic element of such electric double-layer capacitor (hereinafter called a unit cell). In an actual electric double-layer capacitor, since the withstand voltage of the unit cell is comparatively low as described hereinafter, unit cells are stacked so as to match working voltage, as shown in FIG. 2.

First the unit cell will now be described. The unit cell 1 can be produced as described below. A gasket 2, which is made of cylindrical and non-conductive rubber, is vertically divided by a porous separator 3, activated carbon paste electrodes 4, which are produced by kneading activated carbon particles and diluted sulfuric acid, are filled into upper and lower spaces inside the gasket cylinder, respectively, and further the top and bottom of the cylinder are closed up tightly by conductive separators. The porous separator 3 is ion-permeable and electron non-conductive, while the conductive separators 5 are electron conductive and ion-impermeable.

Figure 13A:
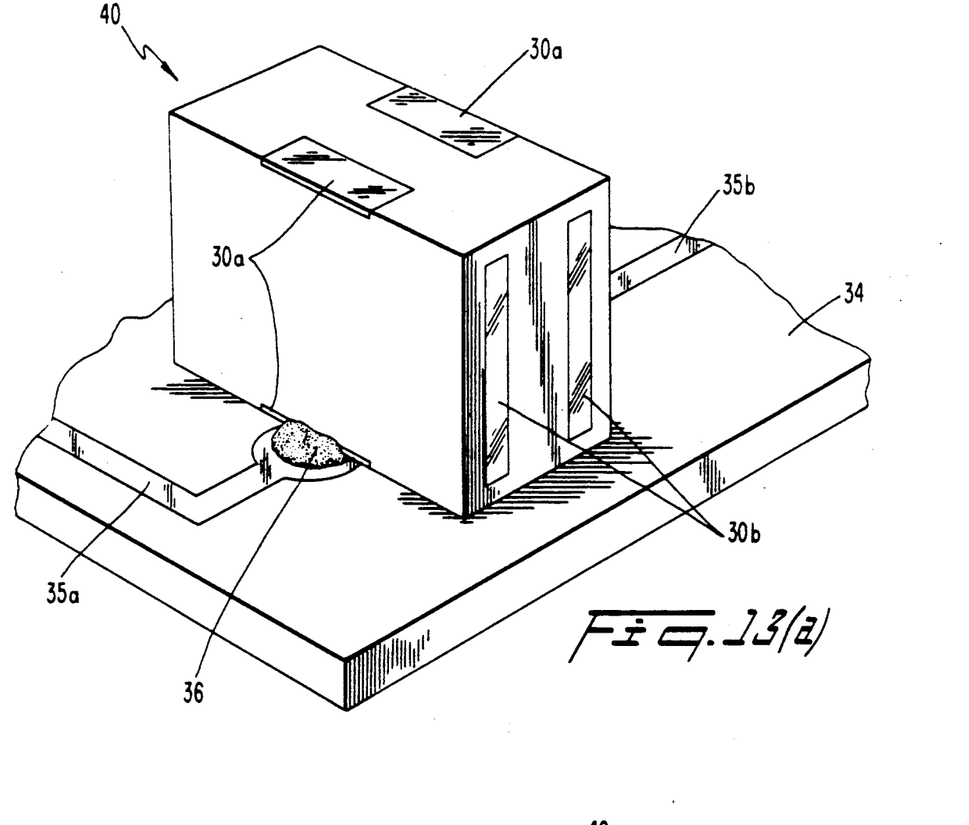
Figure 13B:
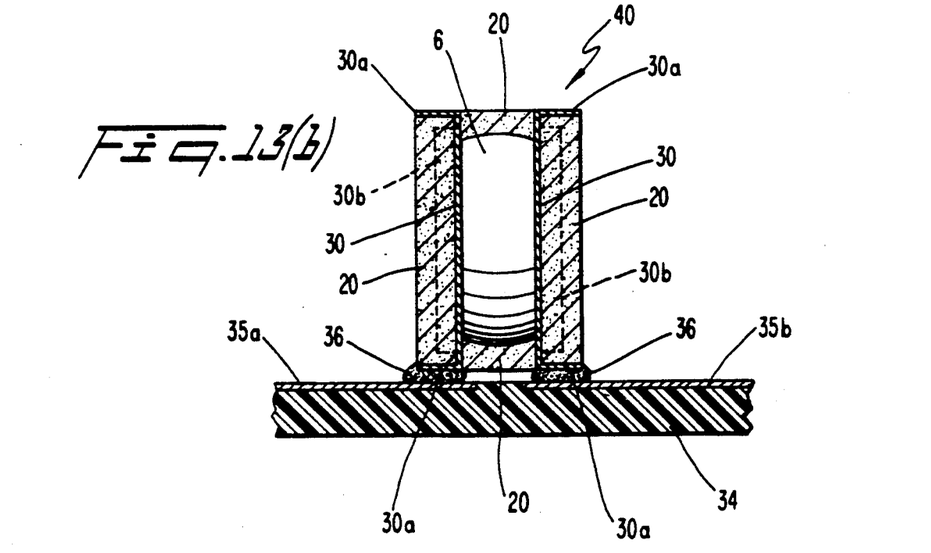

In the unit cell obtained in such a way, its withstand voltage is determined by the electrolysis voltage of diluted sulfuric acid and is low and about 1.2 V. A number of cells required to match the working voltage are stacked so as to form the stacked unit cells 6 as shown in FIG. 2. The stacked unit cells 6 are contained within a metal case 7 as shown in FIG. 13 so as to form an actual electric double-layer capacitor. It may be understood that the stacked unit cells 6 may be constituted by one unit cell according to the working voltage.

Next, the above mentioned stacked unit cells 6 and the completed electric double-layer capacitor will now be described with reference to FIG. 3.

Figure 3:
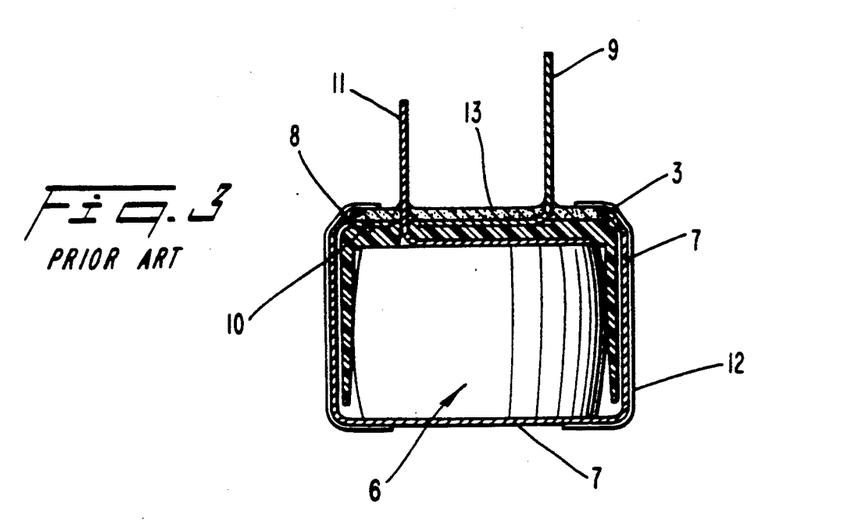
FIG. 3 is a longitudinal section of a prior art electric double-layer capacitor.

In the electric double layer capacitor shown in FIG. 3, the stacked unit cells 6 have a charge holding function and is contained within the metal case 7.

The stacked unit cells 6 have, for example, a construction in which six basic cells 1 are stacked.

The metal case 7, in which the stacked unit cells 6 are contained, applies such pressure as described below to the top surface and the bottom surface of the stacked unit cells 6 through caulked portions 8 provided by caulking an opening end, a first electrode plate 9, an insulator case 10 and a second electrode plate 11.

In the stacked unit cells 6 obtained as described above, there exists internal resistance which consists of contact resistance between activated carbon particles in the activated carbon paste electrode 4 within the unit cells 1, contact resistance between respective unit cells 1 forming the stacked structure and the like.

The value of the internal resistance decreases when the pressure applied from the top and the bottom of the stacked unit cells 6 increases. Therefore, in order to suppress the internal resistance of the entire electric double layer capacitor, it is required to apply the pressure to the stacked unit cells 6 from the top and the bottom thereof. For the purpose of applying the pressure, the above-mentioned caulked portions 8 are provided. Such caulked portions are described in, for example, U.S. Pat. No. 4,394,713 and Japanese Utility Model Laid-open No. 174,338/87.

The value of the above-mentioned pressure is determined in consideration of the value of the internal resistance, pressure resisting capacity of the stacked unit cells 6 and so on, and the value is normally about 10 kg/cm$^2$.

Upon operating the electric double-layer capacitor, voltage is applied between the first electrode plate 9 and the second electrode plate 11 from outside. In this case, the second electrode plate 11 is electrically connected to the top of the stacked unit cells 6. The first electrode plate 9 is electrically connected to the bottom of the stacked unit cells 6 through the caulked portions 8 of the metal case 7, the lateral wall and the bottom surface. Therefore, the voltage from outside is applied to the top and the bottom of the stacked unit cells 6. Consequently the electric double-layer capacitor performs function as a condenser.

By the insulator case 10, the outside surface of the stacked unit cells 6 is insulated from the inside wall of the metal case 7 and the first electrode plate 9 is insulated from the second electrode plate 11.

The opening of the electrode plate side of the metal case 7 is closed tightly by epoxy resin 13 so as to prevent a foreign matter from mingling from the outside or to prevent a chemical fluid from invading upon washing.

In order to prevent the electric double-layer capacitor from short circuiting with other electronic parts when the capacitor is packaged on a printed circuit board, the metal case 7 is covered with an insulator sleeve 12.

In the above-mentioned conventional electric double-layer capacitor since a metal case is used as an armor, the capacitor is complicated in the structure and a large number of assembly parts are required so as to cause it to function as a capacitor.

Thus an insulator case is required to insulate the unit cells from the metal case and to insulate the electrode plates from each other.

An insulator sleeve is required to prevent the electric double-layer capacitor and other electronic parts from short-circuiting with each other.

In order to prevent a foreign matter from mingling into the interior or to prevent a chemical fluid such as washing liquid from invading, it is required to close tightly the opening of the metal case with resin and the like.

As mentioned above, in the conventional electric double-layer capacitor, since the capacitor is complicated in its structure and requires numerous parts to be assembled, while it is accompanied by the complicated process of production, it was not possible easily to reduce the production cost.

Generally in the electronic components, it is desired to have various directions for leading out lead wires therefrom because of the large freedom at the time of packaging of the components. However, in the conventional electric double layer capacitor, when the direction for leading out the lead wire is tried to be changed, design changes of each of the above-mentioned numerous parts are required, and further large-scale changes of the production process such as changes of production equipments and jigs and tools are required. The direction for leading out the lead wire is practically fixed.

Therefore, when the electric double-layer capacitor was used in an actual electronic device, it was difficult to package the parts onto printed circuit boards under the improved package density because of small freedom of arrangement of the parts. Since surface packaging was difficult, automation of packaging was difficult and reduction of packaging cost was prevented.

SUMMARY OF THE INVENTION

Therefore, it is an object of the present invention to solve the problems described above as to the conventional electric double-layer capacitor and to provide an electric double-layer capacitor which has a smaller number of components easily produced, and in which lead wire terminals can be led out in various directions.

It has been found according to the present invention that in the electrical capacitor according to the present invention, the components of the electrical capacitor consist only of unit cells, terminal plates and a molded portion, and operations such as caulking, etc. are not required so that production of the capacitor can be easily performed, by arranging and pressing electrode plates having terminals at the top and the bottom of the capacitor unit cells in the stacked direction thereof, and applying molding process with resin, as it is.

Thus, the present invention provides an electric double-layer capacitor comprising: (a) a stacked unit cells of an electric double-layer capacitor; (b) electrode plates having terminals which are arranged in two different polar surfaces of said stacked unit cells of an electric double-layer capacitor; and (c) a resin armor which covers said stacked unit cells of an electric double-layer capacitor and portions other than a predetermined portion of said terminal of each said electrode plate so as to apply and hold a predetermined pressure to said stacked unit cells of an electric double-layer capacitor in the stacked direction.

The electric double-layer capacitor can be produced by a method comprising the steps of (i) arranging electrode plates having terminals so as to contact with two different polar surfaces of stacked unit cells of an electric double-layer capacitor, thereby setting said electrode plates into a metallic mold; and (ii) injecting resin into said metallic mold to form an integral structure in the state in which the predetermined pressure is applied and held to said stacked unit cells of an electric double-layer capacitor from said metallic mold through said electrode plates in the stacked direction.

The present invention also provides an electric double-layer capacitor comprising; (a) stacked unit cells of an electric double-layer capacitor; (b) electrode plates having terminals which are arranged in two different polar surfaces of said stacked unit cells of an electric double-layer capacitor; and (c) a resin armor which covers said stacked unit cells of an electric double-layer capacitor and portions other than a predetermined portion of the terminals of said electrode plates so as to apply and hold a predetermined pressure to said stacked unit cells of an electric double-layer capacitor in the stacked direction; wherein each said electrode plate is constituted by a rectangular metallic plate each of two opposite sides of which has a terminal projecting in a horizontal direction of each said electrode plate from each said side and bent in a perpendicular direction, and a surface of said plate existing in a direction opposite to said bending direction is arranged to contact with each said polar surface of said stacked unit cells of an electric double-layer capacitor; and each said terminal is exposed from said resin armor in the lines of intersection of two surfaces perpendicular to said stacked direction and a pair of surfaces parallel to said stacked direction.

In this electric double-layer capacitor, each said electrode plate includes preferably a reinforcement rib which is formed by bending said electrode plate in the same direction as the bending direction of each said terminal at each of the two opposite sides different from the sides having said terminals.

Said electric double-layer capacitor can be formed by the method comprising the steps of (i) arranging electrode plates having terminals which project in the horizontal direction of the rectangular metallic plate from the two opposite sides thereof and are bent in the perpendicular direction at said two sides, respectively, for the surface in the direction opposite to said bending direction to contact with each polar surface of stacked unit cells of an electric double-layer capacitor, thereby setting said electrode plates into a metallic mold; and (ii) injecting resin into said metallic mold to form an integral structure in the state in which the predetermined pressure is applied and held to said stacked unit cells of an electric double-layer capacitor from said metallic mold through said electrode plates in the stacked direction.

It is preferred to use the electrode plates which is obtained, for example, by applying pressing process (punching and bending) to a steel blank, and executing surface treating (process for plating the pressed blank, which is plated which copper, with solder).

It is preferred to use, for resin armor, PBT (GF 30%) which is polybutylene terephthalate containing 30% glass fiber and having tensile strength of 1420 kg/cm$^2$ (ASTM D-638), PPS (GF 40%) which is polyphenylene sulfide containing 40% glass fiber and so on.

BRIEF DESCRIPTION OF THE DRAWINGS

FIGS. 13 (a) and 13 (b) are a perspective view and a longitudinal section, respectively, showing the electric double-layer capacitor of FIG. 9 which is packaged onto a printed circuit board.

DESCRIPTION OF THE PREFERRED EMBODIMENTS

The preferred embodiments of the present invention will now be described in detail with reference to the attached drawings.

The first embodiment of the present invention will now be described in order of assembling with reference to FIG. 4 and FIGS. 6(a) and 6(b).

The stacked units cells 6 used in the first embodiment has the same structure as the stacked unit cells 6 of the conventional electric double-layer capacitor shown in FIGS. 2 and 3. The pressure to be applied to the stacked unit cells 6 is determined in a range between 20 and 80 $kg/cm^2$ in consideration of the value of internal resistance and a pressure resisting property of the stacked unit cells 6.

A lower metallic mold 14 for molding the stacked unit cells 6 is worked into a square recessed shape. The bottom of the recess is provided with a column-like pressing pin 15a.

In the first embodiment, an electrode plate 17a with a lead wire 16a, which is formed into a crank shape, is put on the pressing pin 15a of the lower metallic mold 14 such that the crank portion may face upwardly.

Then, the lead wire 16a is positioned by fitting it into a groove for receiving a load wire terminal which groove is engraved in the lower metallic mold 14.

Next, the stacked unit cells 6 are put on the electrode plate 17a, having the lead wire such that the center of the pressing pin 15a of the lower metallic mold 14 and the center of the stacked unit cells 6 may coincide with each other.

Further an electrode plate 17b having a lead wire 16b, which is formed into a crank shape, is put on the stacked unit cells 6 such that the crank position may face downwardly.

Then, similarly, the load wire 16b is positioned by fitting it into a groove for receiving a lead wire terminal which groove is engraved in the lower metallic mold 14.

Next, after an upper metallic mold 18 is caused to descend, the both molds are clamped to each other.

Since the upper metallic mold 18 is provided with a column-like pressing pin 15b at the position corresponding to the pressing pin 15a of the lower metallic mold 14, when clamping the molds, the pressure of 20–80 $kg/cm^2$ is applied to the stacked unit cells 6 from above and down by the both pressing pins through a pair of electrode plates 17a and 17b having load wires.

The height of each of the pressing pins 15a and 15b is determined by the thickness of the resin required to keep the pressure applied to the stacked unit cells 6 even after molding.

Figure 5:
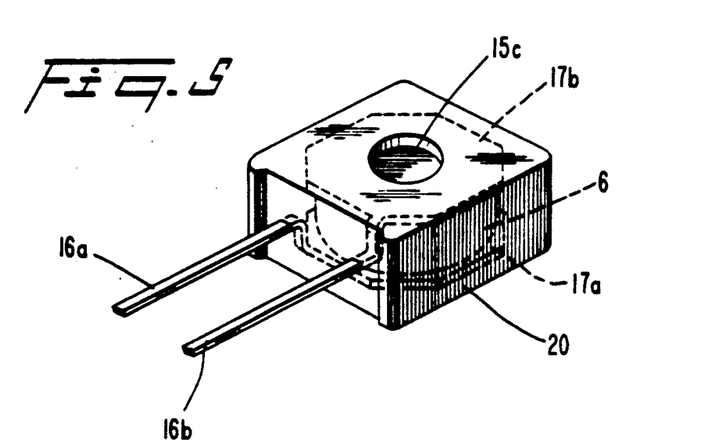
FIG. 5 is a perspective view of an electric double-layer capacitor completed by assembling the components of FIG. 4.

Then, an electric double-layer capacitor armored with molded resin as shown in FIG. 5 is obtained by injecting thermoplastic resin 20 through a resin inlet port 19 of the molding metallic mold at hydrostatic pressure of 600 $kg/cm^2$, and molding the resin so as to be integrated. In FIG. 5 reference numeral 15c is a hole formed within the resin at the position of the pressing pins.

In the electric double-layer capacitor according to the first embodiment obtained in such a way, the components required to assemble the capacitor are only three that is, the electrode plates 17a and 17b having the lead wires and the armor resin 20.

In the conventional electric double-layer capacitor, the components required for assembling were a first electrode plate with the lead wire, a second electrode plate with the lead wire, an insulator case, an armoring case, epoxy resin and an insulator sleeve. On the contrary, in the present invention the components can be reduced by half.

Figure 7:
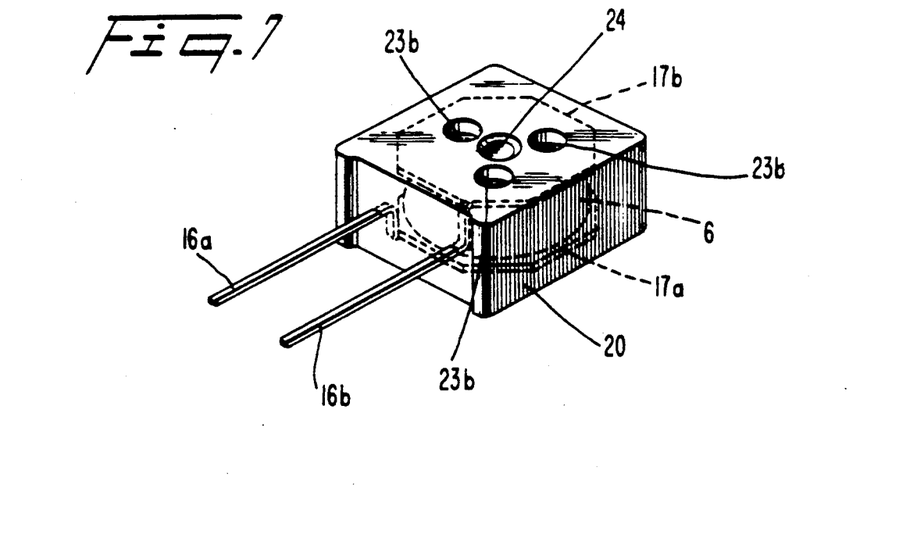
FIG. 7 is a perspective view of a second embodiment of an electric double-layer capacitor according to the present invention.
Figure 8:
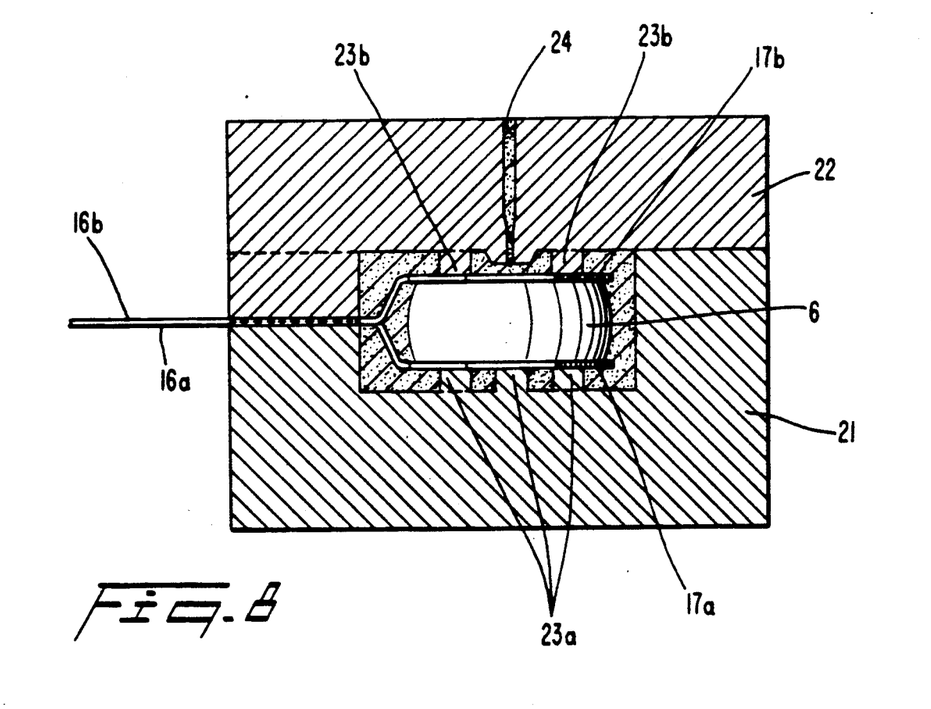
FIG. 8 is a longitudinal section for explaining the embodiment of FIG. 7.

Next, the second embodiment of the present invention will now be described with reference to FIGS. 7 and 8.

Figure 4:
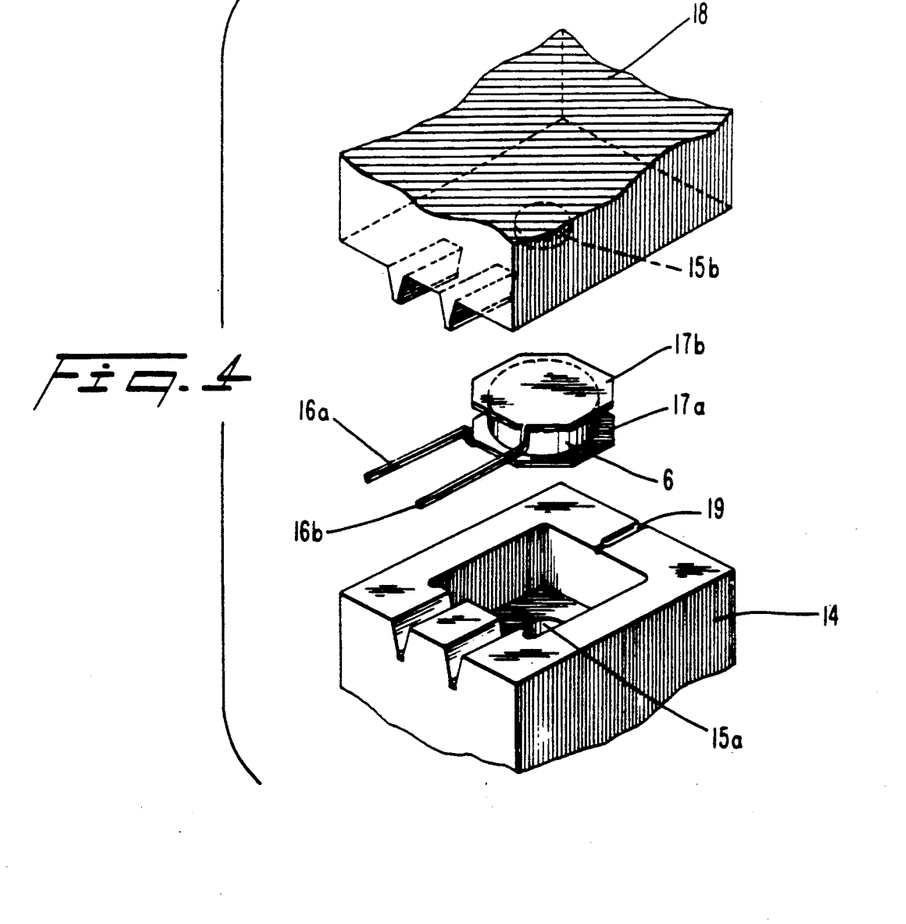
FIG. 4 is an exploded perspective view for explaining a first embodiment of an electric double-layer capacitor according to the present invention.
Figure 6A:
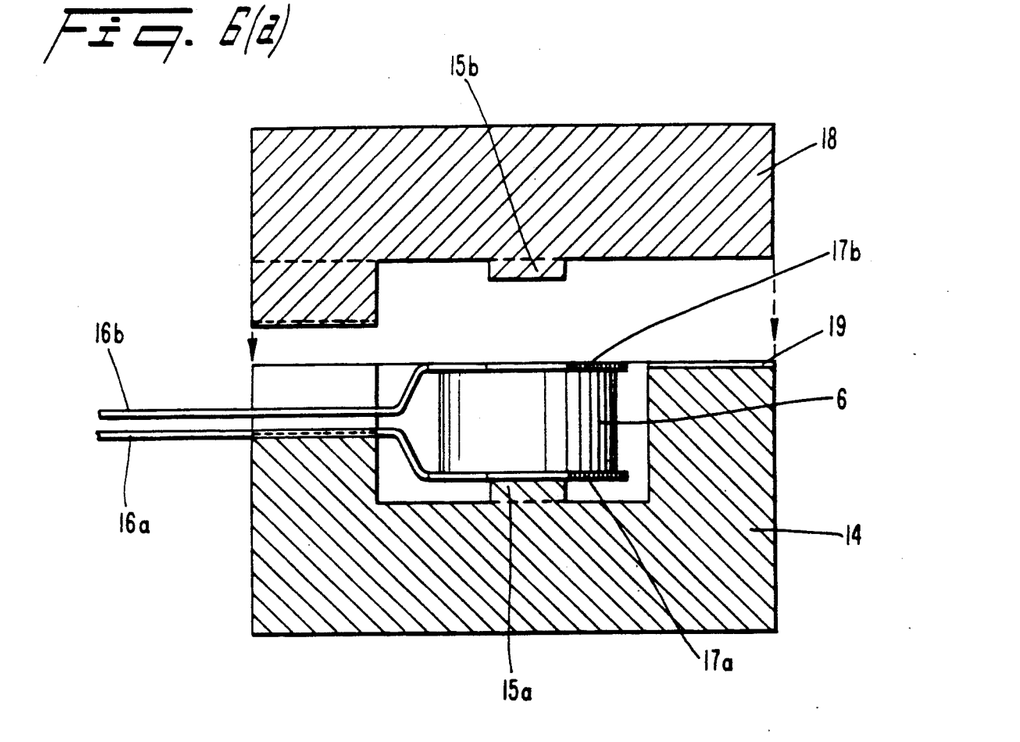
FIGS. 6(a) and 6(b) are longitudinal sections for explaining the embodiment of FIG. 4.
Figure 6B:
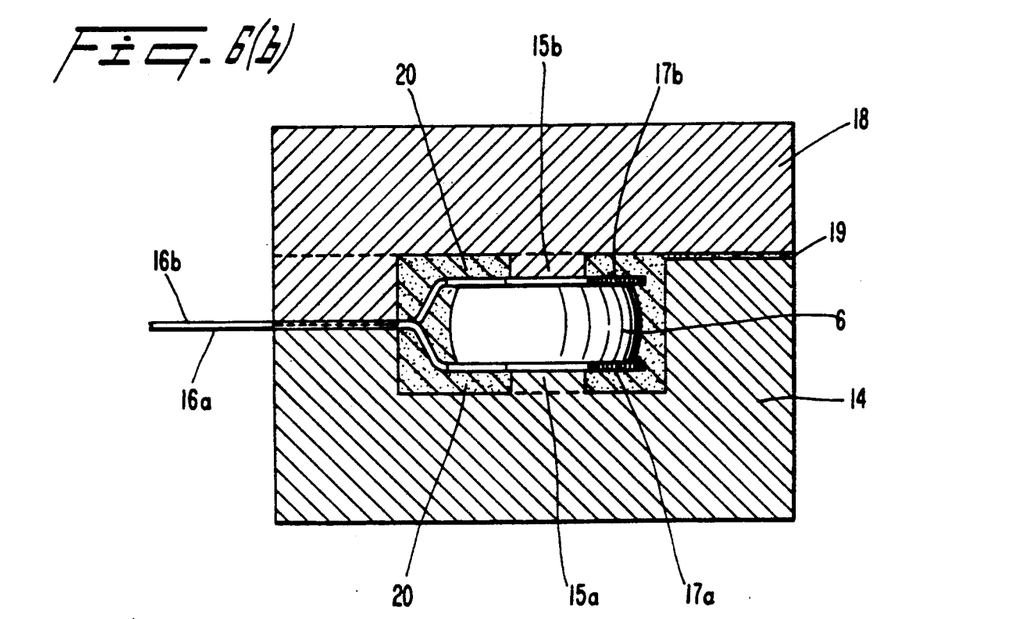

In the first embodiment shown in FIGS. 4 to 6, the pressing pins 15a and 15b are arranged for the centers of these pins to coincide with the center of the stacked unit cells 6. However, in the second embodiment, 3 pressing pins 23a and 23b to every lower and upper metallic molds 21 and 22, respectively, are arranged to be positioned at vertexes of an equilateral triangle.

Assembling of the electric double-layer capacitor according to the second embodiment is executed in order similar to that described in the first embodiment.

The resin used for the molded armor and the condition for the molding the armor is same as the resin used in the first embodiment.

In the above-mentioned second embodiment, since the arrangement of the pouring inlet 24 of resin and the electrode plates 17a and 17b with the lead wires and the stacked unit cells 6 is more symmetrical than that of the first embodiment, the electrode plates with the lead wires are never swept away by the flow of the resin when the resin is injected.

Therefore, the accuracy of the positions of the stacked unit cells 6 and the electrode plates 17a an 17b with the lead wires can be improved.

Next, the third embodiment of the present invention will now be described with reference to FIGS. 9 to 13.

Figure 9:
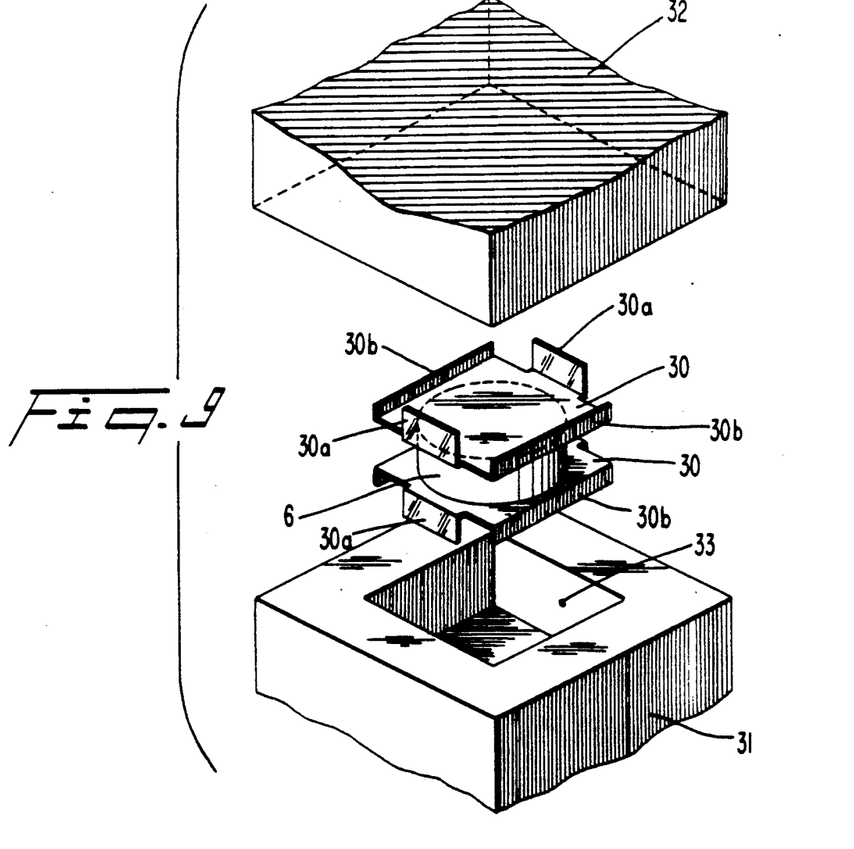
FIG. 9 is an exploded perspective view of a third embodiment of an electric double-layer capacitor according to the present invention.

In the third embodiment, the same stacked unit cells as the stacked unit cells 6, which are used in the conventional electric double-layer capacitor shown in FIG. 2 are used. However, the method for armoring, the shape of the armor and the method for leading out the lead wire terminal are quite different from those in the prior art. According to the third embodiment, the electric double-layer capacitor is an article of a surface mount type armored with resin. The lead wire terminal is exposed only at a portion of the armor resin 20 so as to conform to the surface packaging.

The electric double-layer capacitor of the embodiment is produced as described below. First, two electrode plates 30 and stacked unit cells 6 as shown in FIG. 6 are prepared.

The electrode plate 30 is a metallic plate 0.2 mm thick having sides 9 mm long. And each of two opposite sides is provided with a terminal 30a which projects horizontally and is bent vertically in the L-shape. The projecting portion of the terminal 30a is 2 mm wide and 4 mm long and the height of the bent portion is 2 mm.

Each of the two sides of the electrode plate 30 is provided with a reinforcement rib 30b which is formed by bending the side in the L-shape. The reinforcement rib 30b is provided for the purpose of preventing content resistance of each of the above-mentioned portions and pressure resistance from becoming unstable, because the central portion of the electrode plate is bent convexly so that uneven pressure may be applied to the stacked unit cells 6, when pressure is applied to the stacked unit cells 6 from the metallic mold through the terminal 30a in the molding process described later. The bending direction of the reinforcement rib 30b is the same as that of the terminal 30a. The bent portion is 1 mm high and the portion extends from one end of the side to the other end thereof (namely, is 9 mm long).

The stacked unit cells 6 have a structure similar to that of the conventional electric double-layer capacitor. In this embodiment, the stacked unit cells 6 are formed by stacking 6 unit cells. The unit cell is a disk having a thickness of 0.5 mm and a diameter of 8 mm.

Then the electrode plate 30 and the stacked unit cells 6 are combined to each other to be set into the molding metallic mold.

In this case, as shown in FIG. 9 the electrode plates 30 are arranged at the top and bottom surfaces of the stacked unit cells 6 so that the terminals 30a and the reinforcement ribs 30b are directly outwardly.

The combined body is set into the lower mold 31. The lower mold 31 is provided with a resin injection port 33.

Figure 12A:
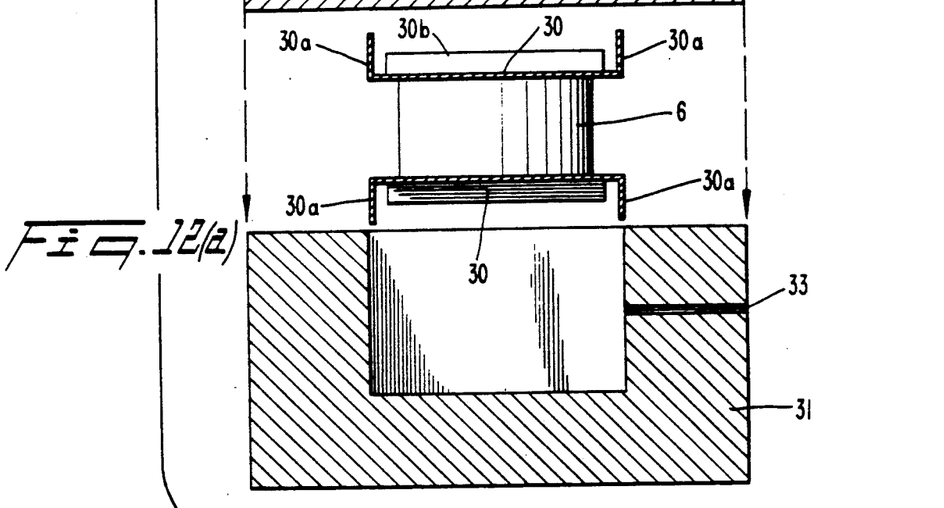
FIGS. 12(a) and 12(b) are longitudinal sections for explaining the embodiment of FIG. 9.
Figure 12B:
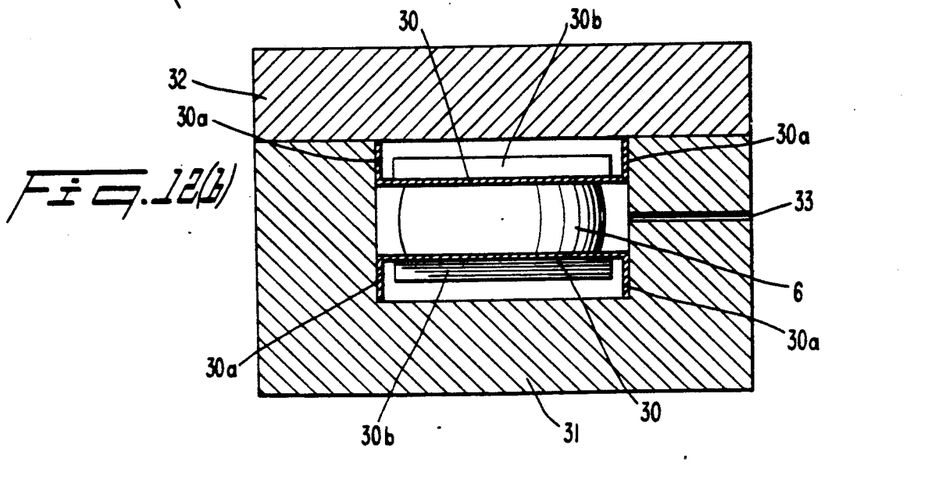

And as shown in FIG. 9 and FIGS. 12(a) and 12(b), the upper mold 32 is put on the lower mold 31 from above. Since the height (2 mm) of the terminal of the electrode plate 30 is higher than that (1 mm) of the reinforcement rib, pressure between the upper and lower molds 32 and 31, respectively, is applied to the stacked unit cells 6 through the upper and lower terminals.

Thereafter, polyphenylene sulfide (PPS), which is heated to melt, is injected through the resin injection port 33 under pressure of 600 kg/cm$^2$, and is cooled and hardened to mold the surface mount type electric double-layer capacitor of this embodiment.

Figure 10:
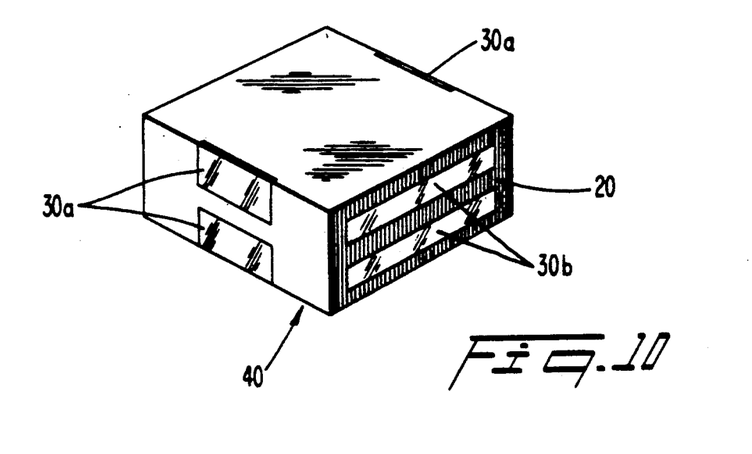
FIG. 10 is a perspective view of an electric double-layer capacitor completed by assembling the components of FIG. 9.
Figure 11:
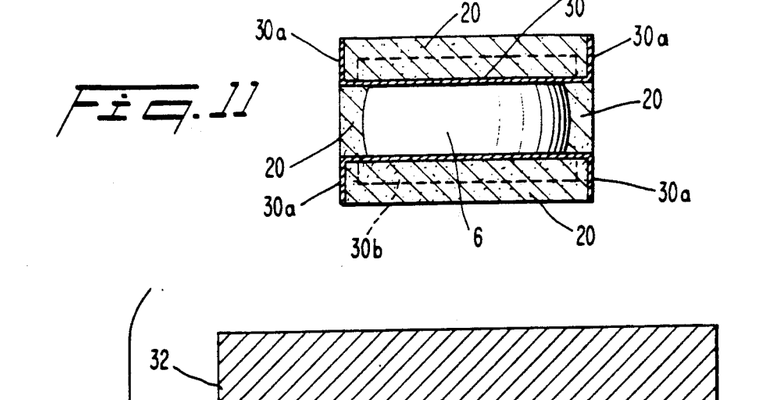
FIG. 11 is a longitudinal section of FIG. 9.

Thus, the surface mount type electric double-layer capacitor 40 can be obtained which is, as shown in FIG. 10, 20 mm long, 20 mm wide and 5 mm thick and in which the terminals are exposed at the lines of intersection formed between the top and bottom surfaces and the side surfaces.

FIGS. 13(a) and 13(b) show the electric double-layer capacitor which is packaged onto a printed circuit board as described above.

FIG. 13(a) is a perspective view of the capacitor which is packaged. It is clear that the electric double-layer capacitor 40 can be packaged onto the surface by connecting the wirings 35a and 35b provided on the printed circuit board 34 to the terminals 30a.

In this embodiment, since the terminal 30a, which are exposed in the surface of the resin armor 20, are vertically symmetrical as shown in FIG. 13(b), the article can be packaged even if it is turned upside down. Thus the freedom of packaging is larger than that in the prior art, and there is not provided the hole which is formed by the pressing pin in the first and third embodiments.

Though thermoplastic polyphenylene sulfide is described to be used for the resin armor 20 in this embodiment, it has the effect similar to that of the embodiment to use thermosetting epoxy resin to form the resin armor by transfer molding process.

As explained above, according to the present invention, the number of components required for assembling can be decreased compared to the conventional electric double-layer capacitor.

Therefore, since the production process can be simplified and the working time can be reduced, production costs can be reduced.

Further, though the direction in which the lead wire is led out has actually not been capable of being diversified in the conventional electric double-layer capacitor, the diversification of the above-described direction can be easily carried out in the present invention. Therefore, freedom of packaging becomes efficiently large.

We claim:

1. An electric double-layer capacitor comprising:
   (a) stacked unit cells of an electric double-layer capacitor;
   (b) electrode plates having terminals which are arranged in two different polar surfaces of said stacked unit cells of an electric double-layer capacitor; and
   (c) a resin armor which covers said stacked unit cells of an electric double-layer capacitor and portions other than a predetermined portion of said terminal of each said electrode plate so as to apply and hold a predetermined pressure to said stacked unit cells of an electric double-layer capacitor in the stacked direction.

2. The electric double-layer capacitor according to claim 1, wherein each said electrode plate includes a reinforcement rib which is formed by bending said electrode plate in the same direction as the bending direction of each said terminal at each of the two opposite sides different from the sides having said terminals.

3. A method for producing an electric double-layer capacitor comprising the steps of:
   (i) arranging electrode plates having terminals so as to contact with two different polar surfaces of stacked unit cells of an electric double-layer capacitor, thereby setting said electrode plates into a metallic mold; and
   (ii) injecting resin into said metallic mold to form an integral structure in the state in which the predetermined pressure is applied and held to said stacked unit cells of an electric double-layer capacitor from said metallic mold through said electrode plates in the stacked direction.

4. An electric double-layer capacitor comprising:
   (a) stacked unit cells of an electric double-layer capacitor;
   (b) electrode plates having terminals which are arranged in two different polar surfaces of said stacked unit cells of an electric double-layer capacitor; and
   (c) a resin armor which covers said stacked unit cells of an electric double-layer capacitor and portions other than a predetermined portion of the terminals of said electrode plates so as to apply and hold a predetermined pressure to said stacked unit cells of an electric double-layer capacitor in the stacked direction;
      wherein each said electrode plate is constituted by a rectangular metallic plate each of two opposite sides of which has a terminal projecting in a horizontal direction of each said electrode plate from each said side and bent in a perpendicular direction and a surface of said plate existing in a direction opposite to said bending direction is arranged to contact with each said polar surface of said stacked unit cells of an electric double-layer capacitor; and each said terminal is exposed from said resin armor in the lines of intersection of two surfaces perpendicular to said stacked direction and a pair of surfaces parallel to said stacked direction.

5. A method for producing an electric double-layer capacitor comprising the steps of:
  (i) arranging electrode plates having terminals which project in the horizontal direction of the rectangular metallic plate from the two opposite sides thereof and are bent in the perpendicular direction at said two sides, respectively, for the surface in the direction opposite to said bonding direction to contact with each polar surface of stacked unit cells of an electric double-layer capacitor, thereby setting said electrode plates into a metallic mold; and
  (ii) injecting resin into said metallic mold to form an integral structure in the state in which the predetermined pressure is applied and held to said stacked unit cells of an electric double-layer capacitor from said metallic mold through said electrode plates in the stacked direction.

* * * * *